United States Patent
Powers, III (12) 
(10) Patent No.: US 6,453,311 B1
(45) Date of Patent: Sep. 17, 2002

(54) SYSTEM AND METHOD FOR PERFORMING CONTEXT CHECKS

(75) Inventor: John Richard Powers, III, Monte Sereno, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 08/239,138

(22) Filed: May 6, 1994

(51) Int. Cl.[7] ................................................ G06F 7/04

(52) U.S. Cl. ............................................ 707/2; 709/318

(58) Field of Search ........................... 395/700; 707/2; 709/318

(56) References Cited

PUBLICATIONS

Quercia et al, X Window System User's Guide, O'Reilly & Assoc., Jan. 1991.*

Adrian Nye, Xlib Programming Manual, O'Reilly and Assoc., pp. 449–452, Mar. 1993.*

* cited by examiner

Primary Examiner—St. John Courtenay, III
(74) Attorney, Agent, or Firm—Blakely, Sokoloff, Taylor & Zafman LLP (57) ABSTRACT

A system and method is described which provides for context checking of an operating environment. A context manager controls the execution of context checks requested by applications or processes. In one embodiment, the context check modules are defined as self-contained modules located in a database. When the data base is opened, these modules are loaded and registered with the context manager. Upon occurrence of certain user actions, the context manager will issue an event to cause the appropriate modules to perform a context check of certain context of the environment. The resulting context information is stored in memory by the context manager and provided to the applications by the context manager when needed. One advantage is that the context checks performed can be changed simply by adding or deleting modules from the database. In other embodiments, context checking functions can also be provided by providing context files, which are loaded at initiation of the context manager and are independent of the database utilized, and by providing certain highly repeatable functions within the function of the context manager itself.

5 Claims, 12 Drawing Sheets

<Define Context Check> "IsWindowShowing", "ISWS", "MoG1", PSTRING
<If> IsWindowShowing("myOptionalData")

*Figure 3b*

| Parameter | Description | Required or Optional |
|---|---|---|
| MoG1 | Identification of target application. The context manager has access to the target application's global variables. | The creator of some target application must be provided. The delivery engine or any executing application can be used. |
| ISWS | Unique 4-character external module ID | Unique 4-character module ID must be provided. This is the name of the 'extm' resource. |
| PSTRING | The data associated with the 'ctxt' key will be a string. | A variety of data types are supported as context check parameters. PSTRING is one of them. |

```
//----------------------------------------------------------------------
//Entrypoint
//We are passed a byte stream.
//The stream has no length byte or terminator. Length is in inSize.
//
//msg is the incoming array of bytes.
//inSize is the size of msg in bytes.
//outMessage is an outgoing array of bytes.
//outSize is the size of outMessage in bytes.
//
pascal OSErr
main(char* msg,
        Size inSize,
        void* outMessage,
        Size* outSize,
        Handle /*notUsed*/);
{
    short result=fase;
    OSErrr    err = noErr;

if(inSize>0)
    {
        //We have incoming data,
        //do something useful with it.
        result = true;
    }
        //Return a pointer to the result.
        Ptr p=NewPtr(sizeof)short));
    if(p)
        {
            //Pointer is okay, we can return the reuslt.
            *p=result;
            *outMessage = p;
            *outSize = sizeof(short);
        }
    else
        {
            //No pointer, cannot return a result.
            *outMessage=nil;
            *outSize=0;
        }
        return(err);
}
```

SYSTEM AND METHOD FOR PERFORMING CONTEXT CHECKS

BACKGROUND OF THE INVENTION

1. Field of the Invention

The present invention relates to the performance of context checks during execution of processes. In particular, the present invention relates to a system and method for evaluating a user's context, wherein the context checks performed can be modified without affecting the application that uses the context check results.

COMPUTER PROGRAM LISTING APPENDIX

This application contains an appendix consisting of a computer program listing of more than 300 lines. The computer listing is provided on a single CD-R and is accompanied by a duplicate copy (two CD-R in total). The material contained on the CD-R is hereby incorporated herein by reference and consists of one file, titled "Appendix A", created on May. 28, 2002, and comprising 177,090 bytes.

2. Art Background

As the use of computer systems have become more widespread, the need to provide application software that is flexible to operate on a variety of systems and within different computing environments has increased. Typically it is the responsibility of the software application to determine the operating environment in order to execute properly without the user providing details regarding the system or the operating environment.

The environment or context of the environment dictates certain functions, such as, for example, whether the display is color or monochrome, the resolution of the display, the operating system executing and features of the operating system such as the memory configuration and the like. It is readily apparent that the need for performing context checks in an automated manner applies to a variety of applications, such as the user interface of the system.

In order for applications to be adaptable to a variety of computers or configurations of computers, it is necessary to perform context checks during execution of these applications. As is done in the prior art, however, the application includes code to perform the necessary context checks and then executes functions in accordance with the results of those context checks. However, if the operating environment changes and additional or different context checks are required, the author of the code must revise the code in order to accommodate those changes. This can be quite cumbersome and inefficient.

SUMMARY OF THE INVENTION

A system and method for performing context checks of system and user environment is disclosed. The context checking mechanism is a general purpose mechanism for performing context checks of the computing environment. Context modules are maintained and loaded into the context mechanism referred to as the context manager. The context manager registers these context modules and through execution of the modules performs context checks when needed or determined by the occurrence of a specific user action, such as movement of the mouse or the like. Memory is allocated to hold results of context checks and these context check results are stored in memory until requested by an application or process. The context manager then provides the results to the application. As the number of modules that is associated with any application is virtually limitless, a variety of context checks can be performed and easily modified without modification of the actual application or operating environment. This feature is particularly beneficial for adapting to upgraded or new environments as they are created.

DETAILED DESCRIPTION OF THE INVENTION

A system and method for performing a check of context, for example, the user context, in a computer system is described. In the following description, numerous specific details are set forth, such as coding examples, in order to provide a thorough understanding of the present invention. It will be apparent, however, to one skilled in the art that the present invention may be practiced without these specific details. In other instances, well-known circuits for performing certain of the functions have not been shown in detail in order not to unnecessarily obscure the present invention.

A computer system of one embodiment is described with reference to FIG. 1. The present invention is preferably implemented on a general purpose micro-computer, such as one of the members of the Apple® Macintosh® family of computers.

The computer system as may be utilized generally comprises a bus or other communications means 101 for communicating information, a processing means 102, coupled to the bus 101, for processing information, and a random-access-memory (RAM) or other storage device 103 (commonly referred to as main memory), coupled to the bus 101 for storing information and instructions for the processor 102. In addition, a read-only-memory (ROM) or other static storage device 104 is coupled to the bus 101, for storing static information and instructions for the processor 102. A data storage device 105, such as a magnetic disk and disk drive, is coupled to the bus 101 for storing information and instructions. An alpha-numeric input device 106, including alpha-numeric and other keys, is coupled to the bus 101 for communicating information and command selections to the processor 102. A cursor control device 107, such as a mouse, trackball, cursor control keys, etc., is coupled to the bus 101 for communicating information and command selections to the processor 102, and for controlling cursor movement. Furthermore, a display device 108 is coupled to the bus 101 for displaying textural, graphical or video output. Additionally, it is useful if the system includes a hardcopy device 109, such as a printer, for providing permanent copies of information. The hard copy device 109 is coupled to the processor 102 through the bus 101. The computer system of FIG. 1 may also include other devices, for example, a means for processing and replaying audio-data as well s other types of input/output devices (not illustrated).

Figure 1:
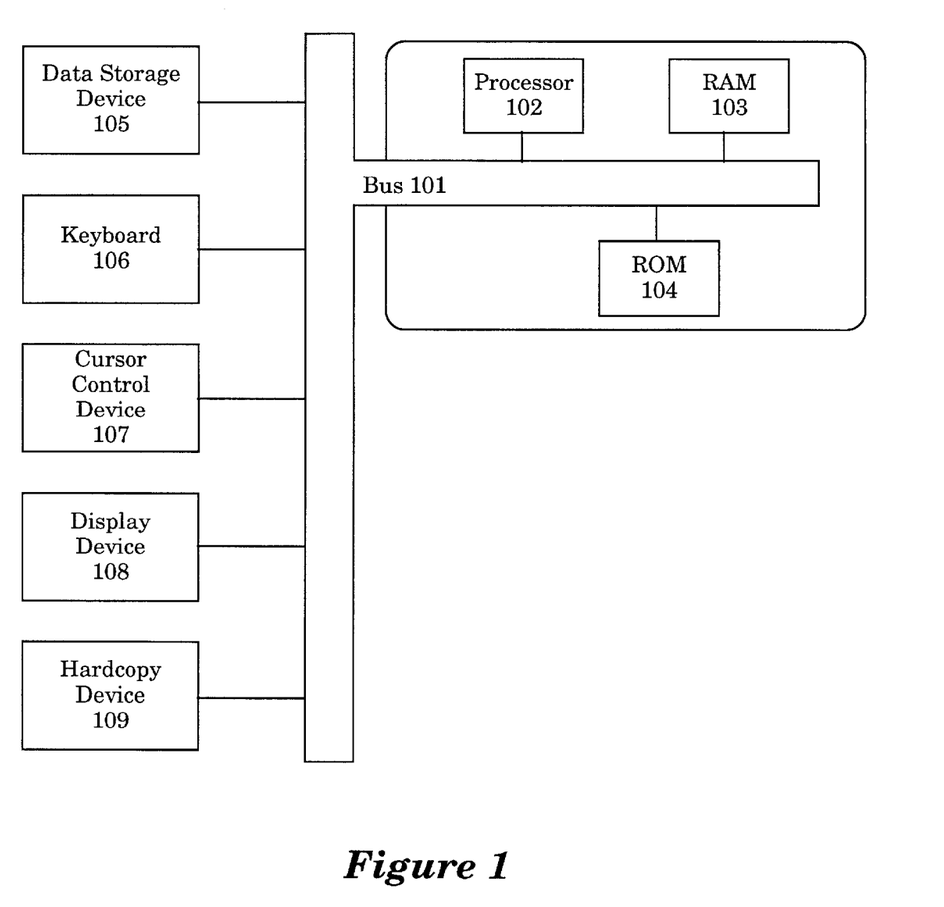
FIG. 1 is a block diagram illustrating the components of a computer system as may be utilized in one embodiment of the present invention.

The computer system illustrated in FIG. 1 is one that generally provides a window-based graphical user interface which is well-known (for example the Apple® Macintosh® family of computers, available from Apple Computer, Inc., Cupertino, Calif.) and is not described in detail herein. In operation, the window-based user interface in the present embodiment is generated and displayed using software stored in the RAM 103 or ROM 104 and executed by the processor 102, as is well-known in the art.

As will become apparent in the description below, various computer elements provide the functionality described. For example, a window is displayed on the display device 108 and the processor 102 provides processing resources for the delivery engine and context manager. A generated data base, described herein, is stored in the data storage 105 and loaded into the RAM 103 as needed during the execution of the delivery engine. In the present embodiment, the context manager is implemented as part of the delivery engine for providing context-specific information during execution of elements extracted from the data base by the delivery engine. However, it will be apparent from the description below that the context manager's features and attributes have application in a wide variety of areas. Furthermore, the context manager can be implemented as an independent processing entity or as part of another component, such as the operating system. Accordingly, the present invention is not limited by the following detailed description of this embodiment and it is understood to those skilled in the art that the present invention may be embodied in a variety of configurations in a variety of computer systems.

A brief description of the delivery engine will now be described. For more detailed information regarding the delivery engine, see U.S. application Ser. No. 08/059,542, filed May 10, 1993now U.S. Pat. No. 5,428,731, entitled "An Interactive Multi-media Delivery Engine", which is assigned to the common assignee Apple Computer, Inc. The delivery engine provides for the presentation of information using a variety of media.

Figure 2:
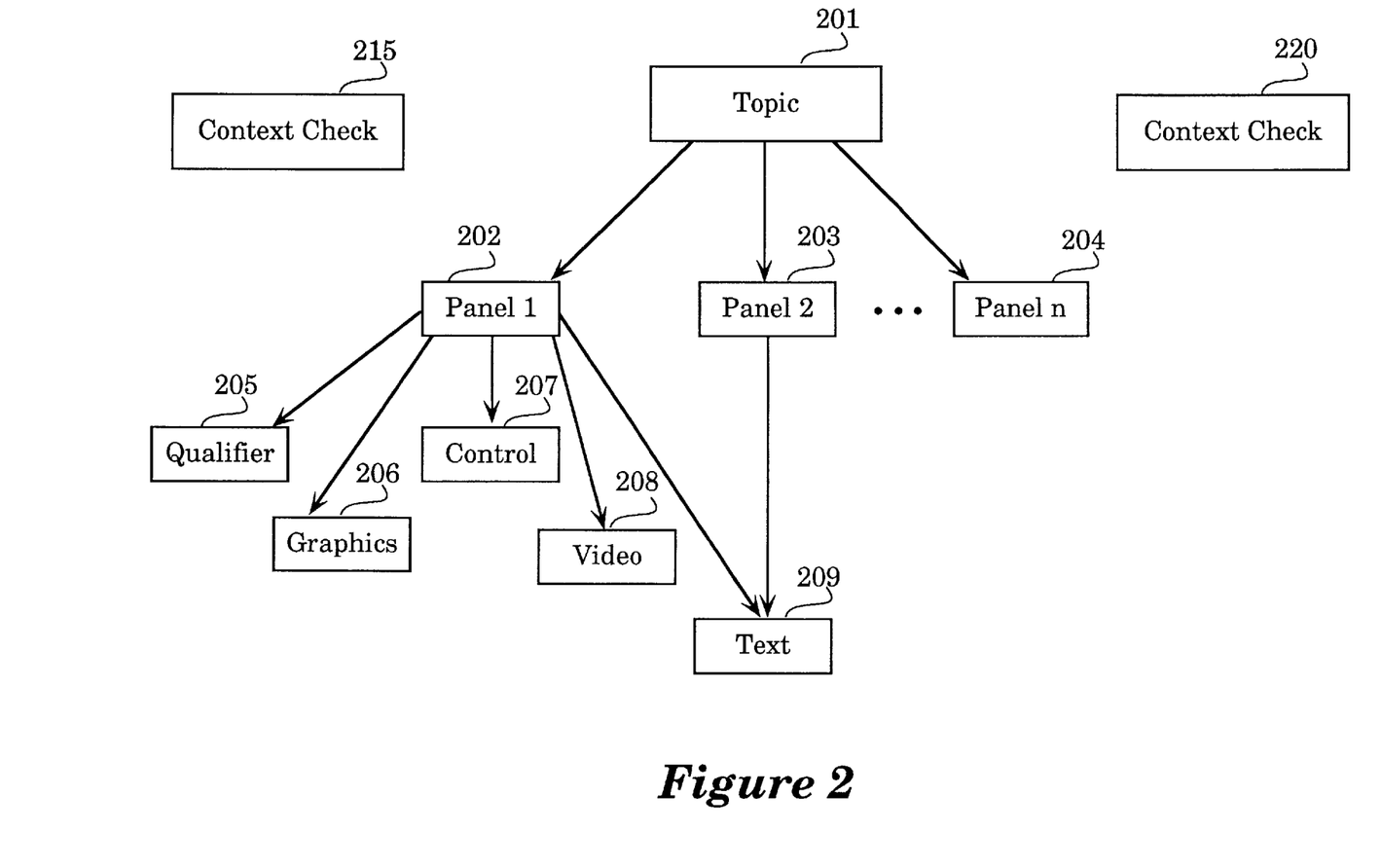
FIG. 2 is a block diagram illustration of the database elements employed in one embodiment of the present invention.

In the present embodiment, the delivery engine provides a help system to supply user instruction. Referring to FIG. 2, the user instruction is organized as a series of topics. Each topic 201 contains general information and a reference to panels 202, 203, 204 which are displayed to the user. Each panel contains references to visual media 206 as well as control 207 and qualifier 205 objects. The topics 201, panels 202, 203, 204, media 206, controls 207 and qualifiers 205 are all encapsulated as individual entities in a data base. The delivery engine operates responsive to current and prior operator input to retrieve objects from the data base indicative of the next data to be displayed.

As noted above, the data base contains a plurality of objects. For example, a topic points to a series of panel objects, and each panel object may be linked to a qualifier object, graphic data object, control object, video-data object, or text-data object, causing the corresponding information to be displayed when the object is instantiated or executed. In the currently preferred embodiment, the C++ programming language is used because of its inherent capability to support object-oriented programming. However, it would be apparent to one skilled in the art to use alternative programming languages such as ADA or Modula-2, which would not cause departure from the spirit and scope of the present invention.

Below is an example of a panel definition:
<Define Panel> "Menus"
   MoGuide menus are:*
   File
   Edit
   MoGuide
   Window
   Click the right arrow to continue.
<End Panel>

Figure 3A:
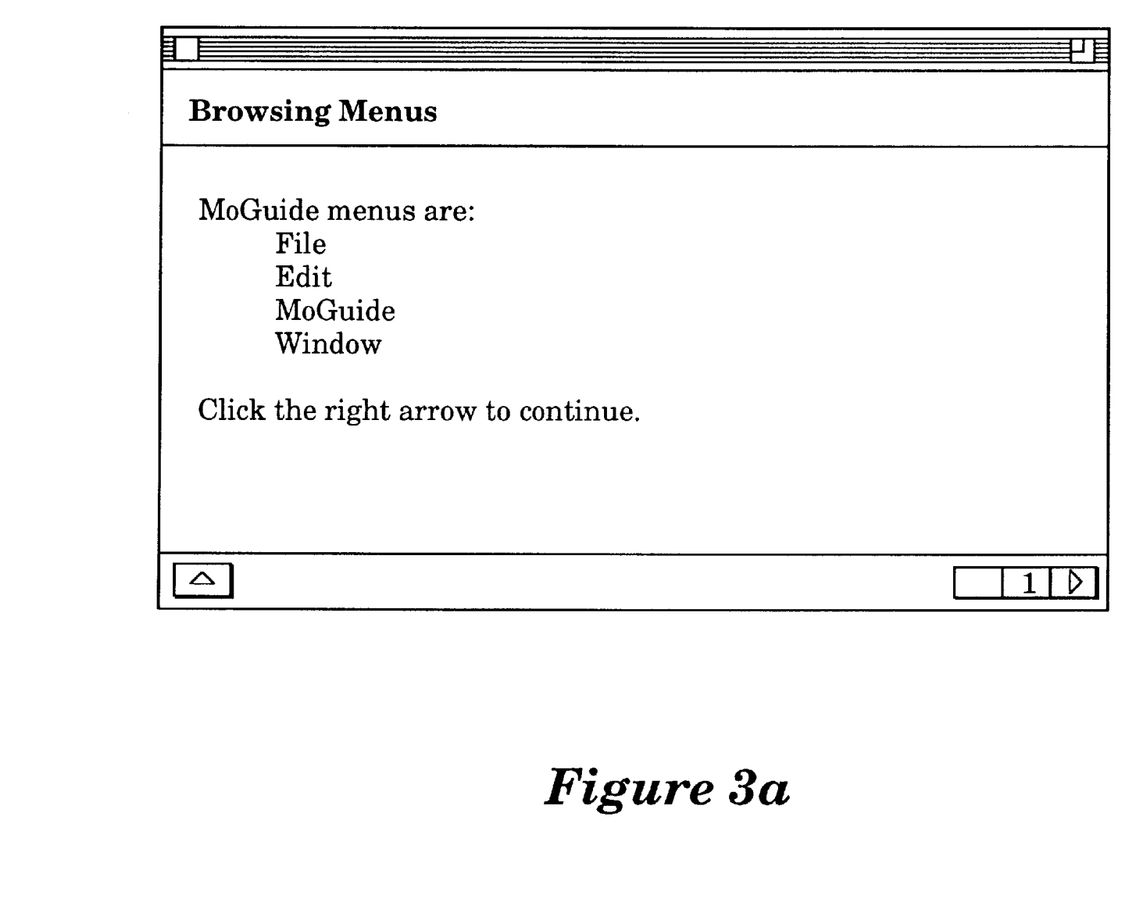
FIG. 3a is illustrative of a panel display.

The elements, <Define Panel> and <End Panel> are commands. The text between the commands are data that is displayed in the presentation window. FIG. 3a shows what the panel looks like when it is displayed.

Preferably, each object in the data base is defined as a Macintosh® resource. A Macintosh® resource is code or data that may be used by various applications. Macintosh® resources are described in the publication entitled "Inside Macintosh Volume 1" by Apple Computer, Inc. (Addison, Wesley Publishing Company Inc.).

During the operation of the delivery engine, elements are used typically when they are needed. Thus for example, a topic is retrieved from the data base and instantiated as an object. The topic object contains general topic information in a list of panels associated with the topic. Each panel that is linked to a topic is then retrieved from the data base and also instantiated as an object. Each retrieved panel similarly contains a list of panel objects and each panel object is also retrieved from the data base and instantiated as an object.

Furthermore, each qualifier linked to a panel is retrieved and instantiated as an object. Once all panels and panel objects have been retrieved and instantiated, the delivery engine begins an execution sequence with a first panel identified by qualifiers that indicate that the panel can be shown or has no qualifiers. Below is an example of a simplified presentation sequence of a topic with no qualifiers, for a series of panels.

| | |
|---|---|
| <Define Sequence> | "Browsing Menus" |
| <Panel> | "Menus" |
| <Panel> | "Menus - File" |
| <Panel> | "Menus - Edit" |
| <Panel> | "Menus - MoGuide" |
| <Panel> | "Menus - Window" |
| <End Sequence> | |

The panel object contents, for example, the text, graphics and video-data that are to be displayed on the panel, are retrieved. Once the panel contents are retrieved they are displayed on the panel display area of the presentation window. Subsequent panels are displayed in accordance with options provided to the user and the qualifiers associated with each panel. Therefore, the delivery engine, in conjunction with the data base objects, perform the same function as what most recognize as an application program.

In accordance with the teachings of the present invention, also included in the resources available in the database are context modules 215, 220. One or more context modules may be included in a single file. Each context module is a resource object which, when evaluated or executed, provides specified information regarding the user's context. For example, a module may provide a true or false value as the result of the check of a specific element of the user's context. Examples of context checks perform include a window that is "up front", an application that is executing at the time, as well as context checks regarding the system configuration, such as, whether the display is color or monochrome or if audio is available. It is readily apparent that the context modules need not be part of a type of structure typically identified as a database, but also can simply be files identified as context modules by the context manager and located in memory or data storage.

Previously, context checking operations were designed into the code of the application executing, for example, the delivery engine. As computer systems change, the type of context checks required change. In such a case, the application is updated to modify the context checks to be performed. The present invention is flexible to extend the context checking performed to accommodate present as well as future user context that may be needed. Thus, for example, as newer generations of computing environments are created, the delivery engine does not have to be changed. Rather, the data base is simply updated by adding and deleting context check modules. Preferably the context modules are identified to be of the type "external" such that the modules are loaded at the time the database is opened. In the present embodiment, external modules are stand-alone resources.

An object, referred to herein as TUserContext, is loaded into the delivery engine. This object, TUserContext, is instantiated when the data base is opened. The TUserContext object is a module of C++ code and performs the functions of the context manager to provide the instructions to perform context checking in accordance with the teachings of the present invention. However, it is readily apparent that the TUserContext Module can be realized as other types of code, which when executed, performs the functions discussed herein.

The TUserContext Module, once instantiated, searches the data base for external modules and installs each external module. In order to ease the communications between each context module and TUserContext, an Apple® event handler is installed for each module and communications are achieved through Apple events. Memory is also allocated to hold the results of the context checks performed by the modules. Thus, when a user action or other trigger, such as a time out function, occurs and a context check is to be performed, the handler for particular context module is retrieved and the context module code is executed. The result of the execution of the context module code is then stored in the internal memory. When the result of the context check is required, whether immediate or at a later time, the information is readily available and provided by TUserContext. In the present embodiment, a context check is performed by generating an Apple event to communicate a request for updated context information to the appropriate context module and storing the result of the context check received in response into memory. The context manager subsequently provides context information to a requesting application or process by reading the appropriate information stored in memory and communicating that information to the requesting application in process.

Figure 3B:
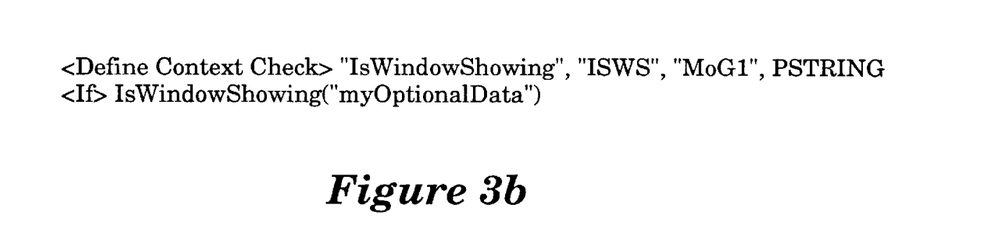
FIG. 3b is an example of an event, FIG. 3c describes the parameters of the event.
Figure 3C:
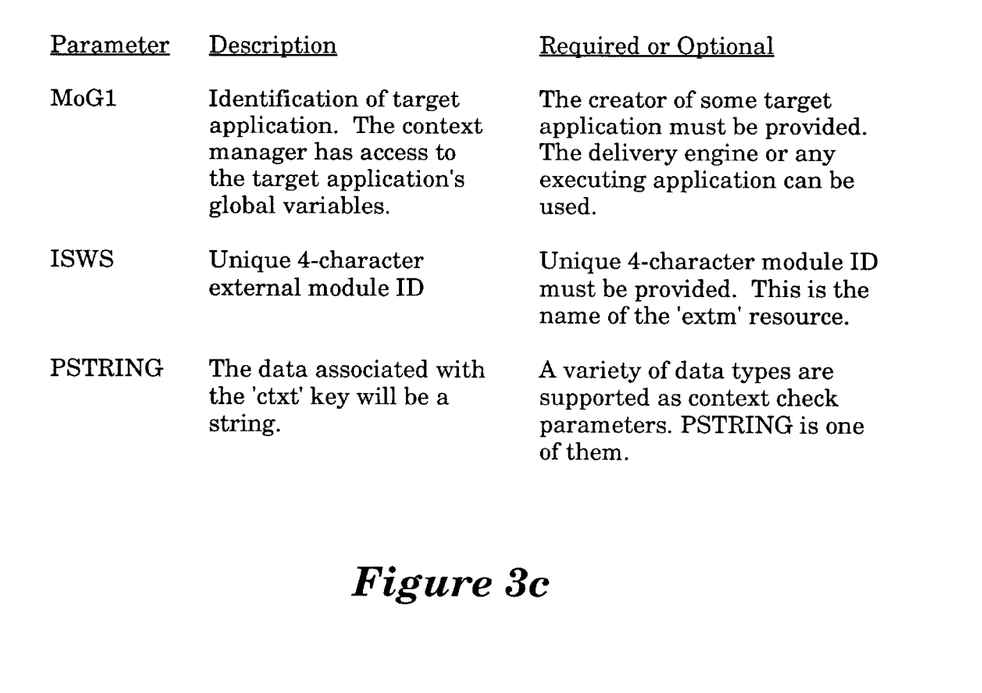
Figure 3D:
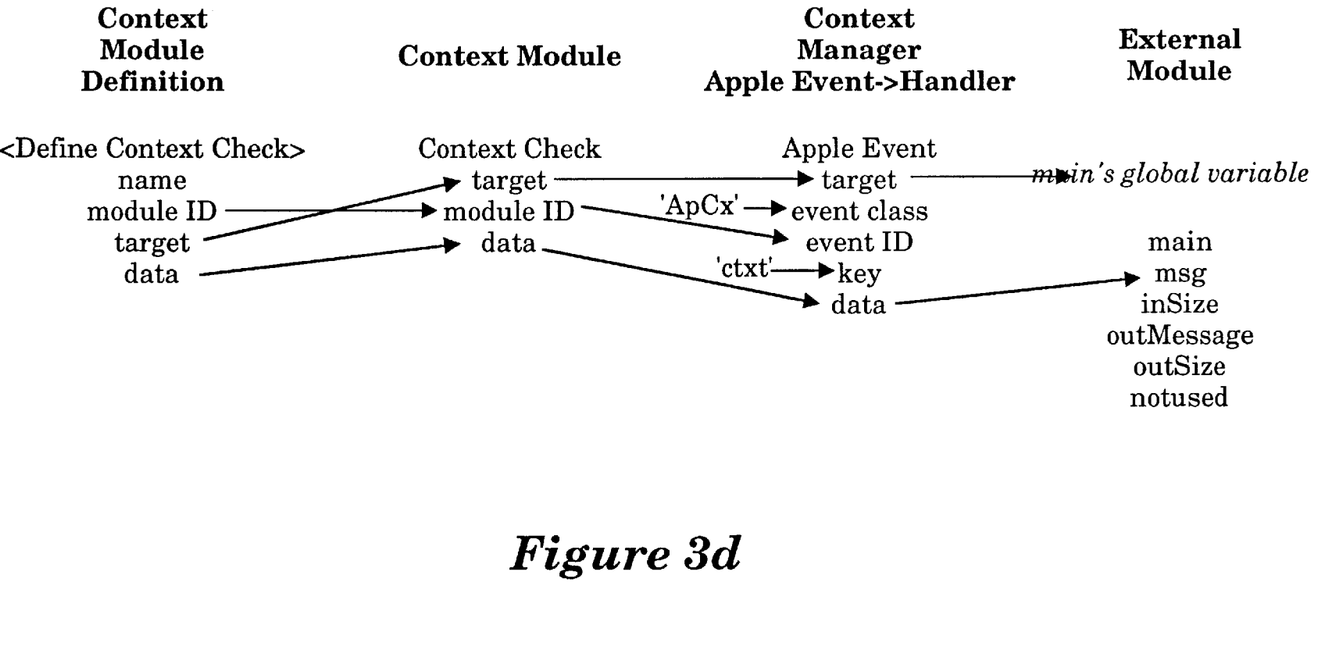
FIG. 3d illustrates the process flow of the event from definition to execution and FIG. 3e is an exemplary listing of a shell of an external context module.

FIG. 3b is an example of an event identified as ISWS and FIG. 3c describes the parameters of the event. In this example, the event is issued to the appropriate external context module when the window is displayed. A button action or lapse of a predetermined amount of time can also be defined to send an event. FIG. 3d illustrates the flow of the event from definite on to execution.

In this example, the string "myOptionalData" is passed to the "msg" parameter as a pointer to a stream of bytes with no length byte or null terminator. The "inSize" parameter provides the length of the byte stream. In this illustration, a mixture of various data types including shorts, longs, and strings, can be passed. The data types are concatenated in the "msg" byte array with the strings word-aligned.

External modules are stand-alone code resources whose segment/resource name is a unique 4-character ID and resource type is "extm". Below is an example of an external module entry point.

pascal OSErr
    main (char* msg,
        Size inSize,
        void* outMessage,
        Size* outSize,
        Handle /*notUsed*/);

The following external module parameters for a context check may be used:

| Parameter | Description | Example |
| --- | --- | --- |
| msg | The context check function parameter in the context manager file. | "myOptionalData" |
| inSize | Length of the msg data in bytes. | 14 |
| outMessage | Return a pointer to a short. The short contains 1 for true, 0 for false. | 1 |
| outSize | Return the length of the outMessage data in bytes, 2 for short. | 2 |
| notUsed | (not used) | (not used) |

More particularly, the following parameters are preferably passed to a context module when an event is generated:

| Parameter | Description | Example |
| --- | --- | --- |
| msg | The optional data in the <Define Event> | "myOptionalData" |
| inSize | Length of the msg data in bytes. | 14 |
| outMessage | (not used) | nil |

Figure 3E:
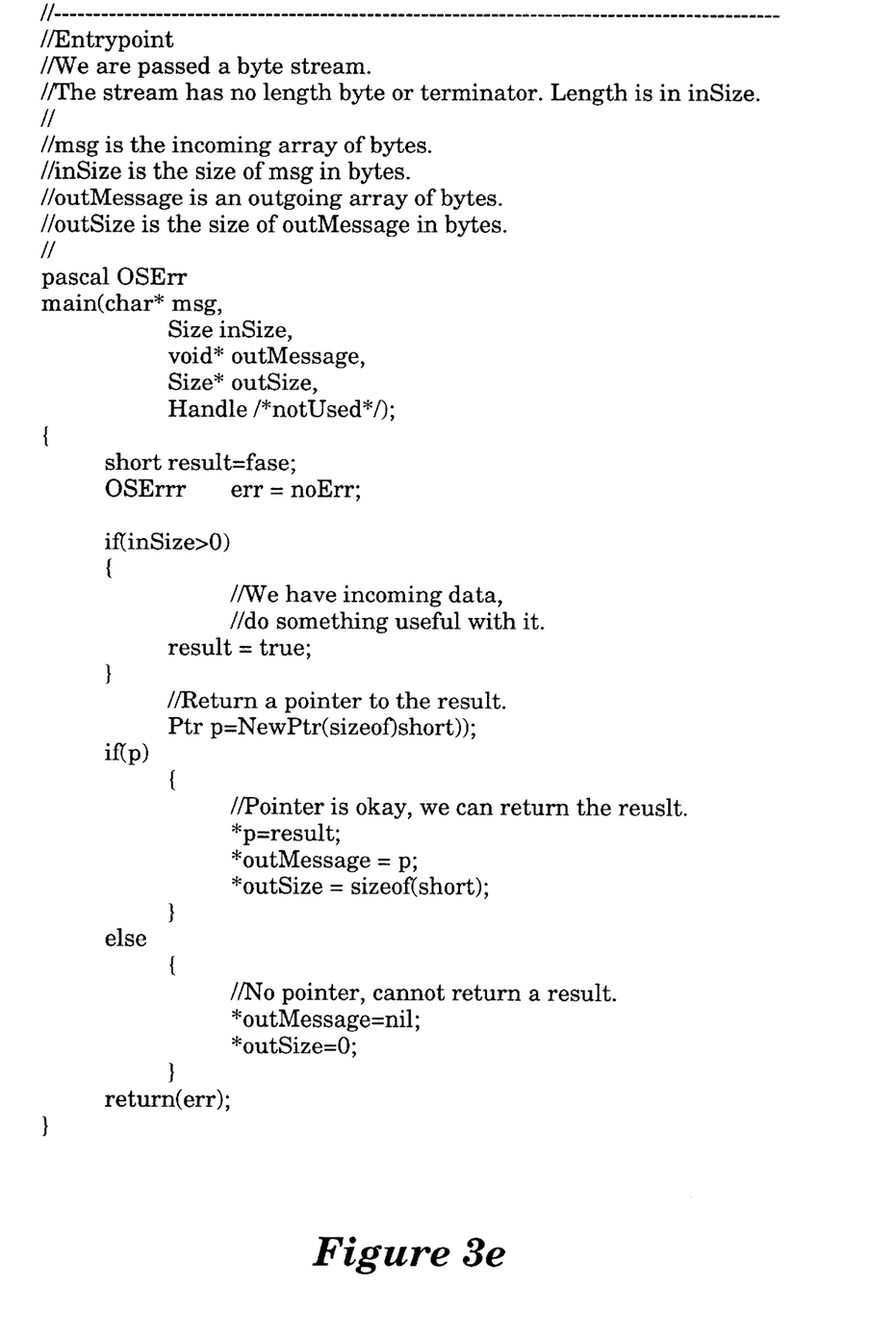

FIG. 3e is an exemplary listing of an external context module which is a shell for a context module. The shell provides a framework for adding the specific instructions to perform a context check. This shell is used to "author" or create the instructions of the context module. An authoring mechanism, for example, a compiler, is used to compile the instructions into a code that can be executed. The shell code can be modified to include the desired context function by replacing the default line of code "result=true" with the function that tests a specified state or context of the system. For example, if the context check is to determine if a modal dialog window is displayed, the following instruction would be added:

If (GetFrontModalWindowClass ( )!=0) result=true;

The function, GetFrontModalWindowClass ( ) is a function provided in the Macintosh ® operating system toolbox library.

Figure 4:
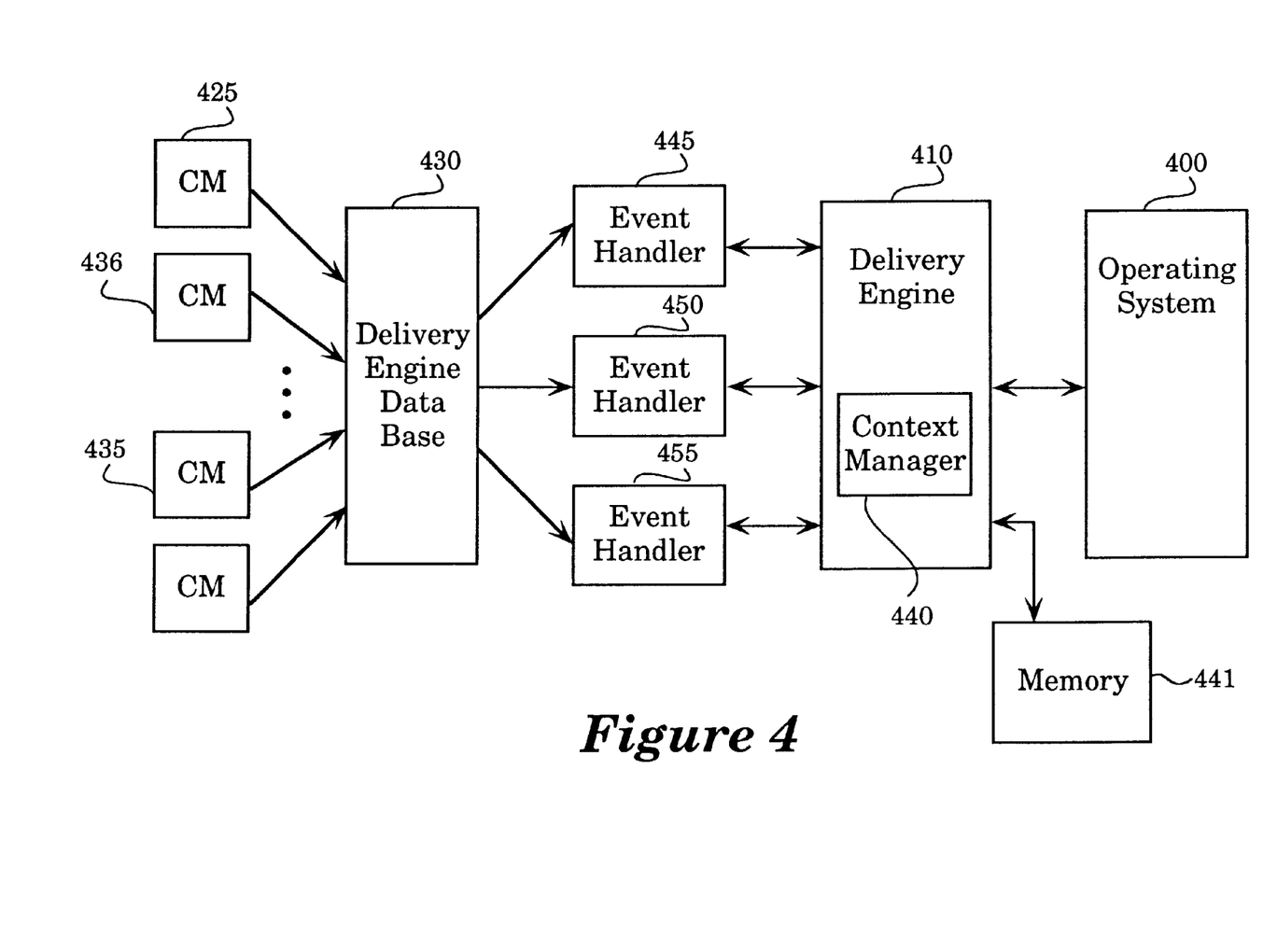
FIG. 4 is a simplified block diagram illustrating the system of one embodiment of the present invention.

A simplified block diagram illustrating the system and method of the present invention is shown in FIG. 4. The operating system of the computing environment 400 is coupled to the delivery engine 410 which is coupled to the delivery engine data base 410. The data base consists of a plurality of objects or modules 425, 435, 436. Among these objects are external modules containing context modules which have been provided in accordance with the teachings of the present invention. The delivery engine includes the context manager 440 which controls and manages the external context modules that are used to perform the context checks and stores the results of the context checks performed in the memory 441. As noted earlier, each external module has an associated event handler 445, 450, 455 which provides the communication ability between the external module and the context manager through Apple® events. Apple® events are described in detail in "Inside Macintosh, Interapplication Communication" by Apple Computer, Inc. (Addison Wesley 1993), and, as are well-known in the art, need not be further discussed herein.

Figure 5:
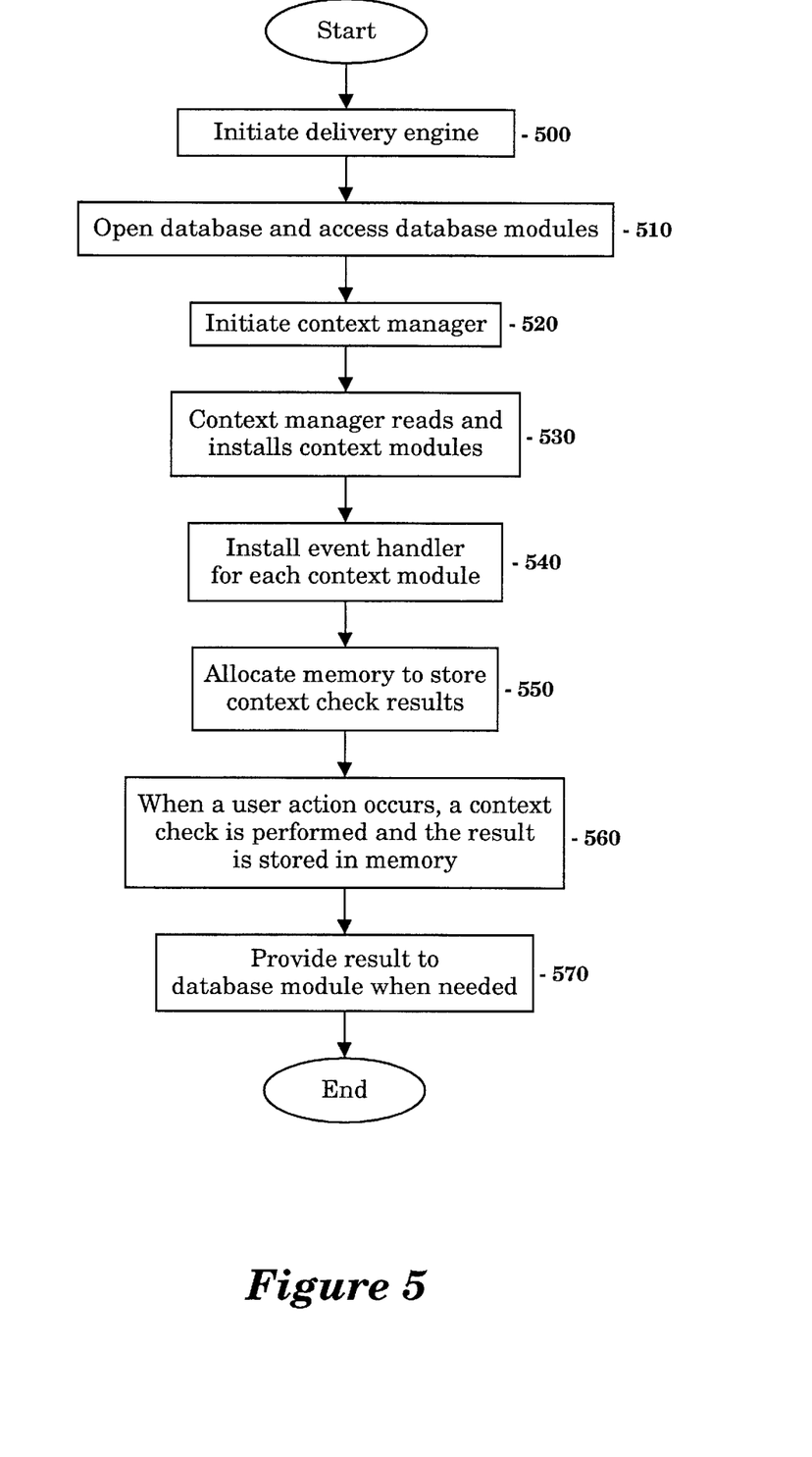
FIG. 5 is a flow diagram illustrating the process steps used to perform context checking in accordance with the teachings of the present invention.

The process is generally described with reference to FIG. 5. At step 500, the delivery engine is initiated. The data base is opened to retrieve the appropriate data modules or objects to be utilized by the delivery engine, step 510. The context manager is instantiated or initiated at step 520. The context manager reads and installs the external context modules, step 530. At step 540, an event handler is installed for each context module, in order to provide the ease of communication between the context manager and the context module. Internal memory, step 550, is then allocated to store context check results. Thus, at step 560, when a user action occurs, a context check is performed and the results are stored in memory. At step 570, the result of the context check is provided to a requesting application or process when needed.

Figure 6:
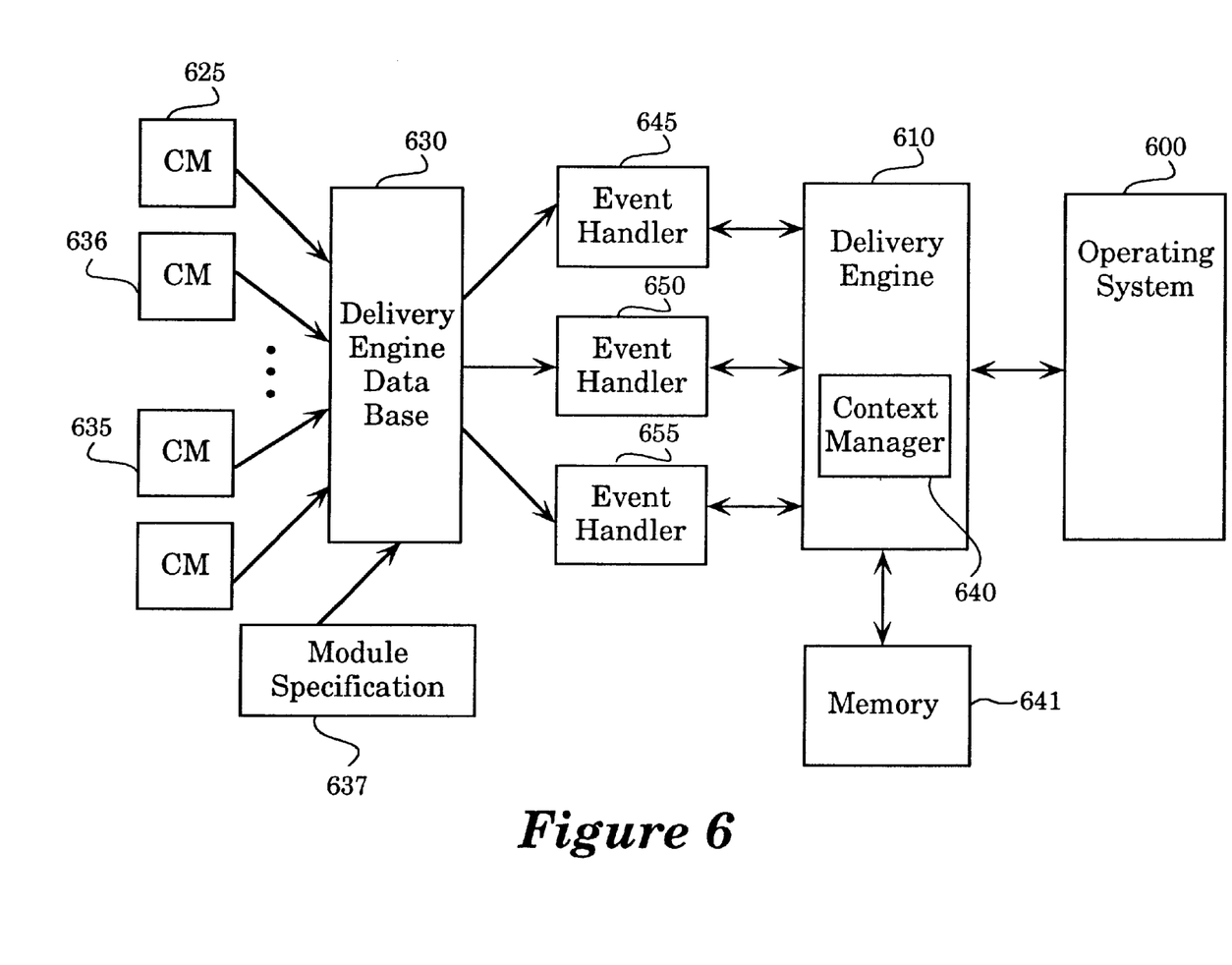
FIG. 6 is a block diagram of the components employed in an alternate embodiment of the present invention.

An alternate embodiment of the present invention is shown in FIG. 6. In addition to the operating system 600, delivery engine 610, context manager 640, event handlers 645, 650, 652, 655, delivery engine data base 620 and modules 625, 630, 635, a module specification is provided, preferably as a module in the data base, to enable ease of identification and extensibility of the context checking function. This capability also enables modules from different data bases to access one another. For example, a qualifier from a topic originating from a first database can request context information that is generated by a module located from a second data base. The module specification 637 provides information and data regarding the context modules and is reference by the context manager to access context modules.

In the present embodiment, a context module specification is provided for each context check. Preferably, the context module specifications are located in a data structure or linked list which is created and maintained by the author of the context modules. Each context module specification is identified by a context check identification such as a context check number. This context check identification is supplied by an application requesting certain context information (i.e., results) and is used by the context manager to retrieve the specification for a particular context check. For each context check identified, the specification identifies the context module to perform the context check and parameter information which is used by the context module to perform the context check. The context specification enables a single context module to perform more than the context check, dependent upon the parameter information passed to the context module. In addition, it is preferred that the context specification identify the target application within which the context check is performed. This feature is advantageous in a multi-processing environment.

The context manager therefore receives a notification to perform a context check as identified by a context check identification. The context manager retrieves the context specification associated with the context check identification to identify the context module to execute to perform the context check, preferably by a module identification (module ID), and the parameters to be passed to the context module to perform the specific context check function. An event is then issued for the identified module and the handler for the process responds to execute the context module. When a process subsequently requests context information, it does so by identifying the context by the context number. The context manager retrieves the results of the corresponding context check performed from memory and provides the results to the requesting process.

In the present embodiment, the context manager provides context information to the delivery engine. However, it is readily apparent that one or more other processes executing on the system can request context information from the context manager. Furthermore, in the present embodiment, upon occurrence of certain user events, the delivery engine notifies the context manager to perform certain context checks. It is also readily apparent that other processes, including device handlers or other portions of the operating system, can notify the context manager of a context check to be performed. The results of a context check performed by a context module are stored in memory identified by the module ID. Thus, the context manager performs a look-up using the module ID to retrieve the context check information. Preferably state information is also stored with each context check result. The state information may include information as to whether the data is locked or whether an error occurred during the last context check performed.

The system is flexible to permit other objects besides the external context modules to provide context check information. Preferably, a registered module list is generated and maintained by the context manager. The registered module list is preferably a linked list identifying each module loaded by its module ID and a pointer to the module ID of the next context module registered with the context manager. Using the registered module list, other objects, such as files, system code extensions or other applications can be used to provide context information Furthermore, as will be described below, the registered module list enables the context manager to override prior registered modules.

Preferably each entry in the registered module list includes an identification of the context module (module ID), the address of the module in memory, the address of the module the present module is overriding (if any), global or persistent data allocated that the module can reference or modify, and a pointer to the next entry in the list. The global data is preferably allocated and initialized when the delivery engine is initialized and is referenced and/or modified by the context module.

Figure 7:
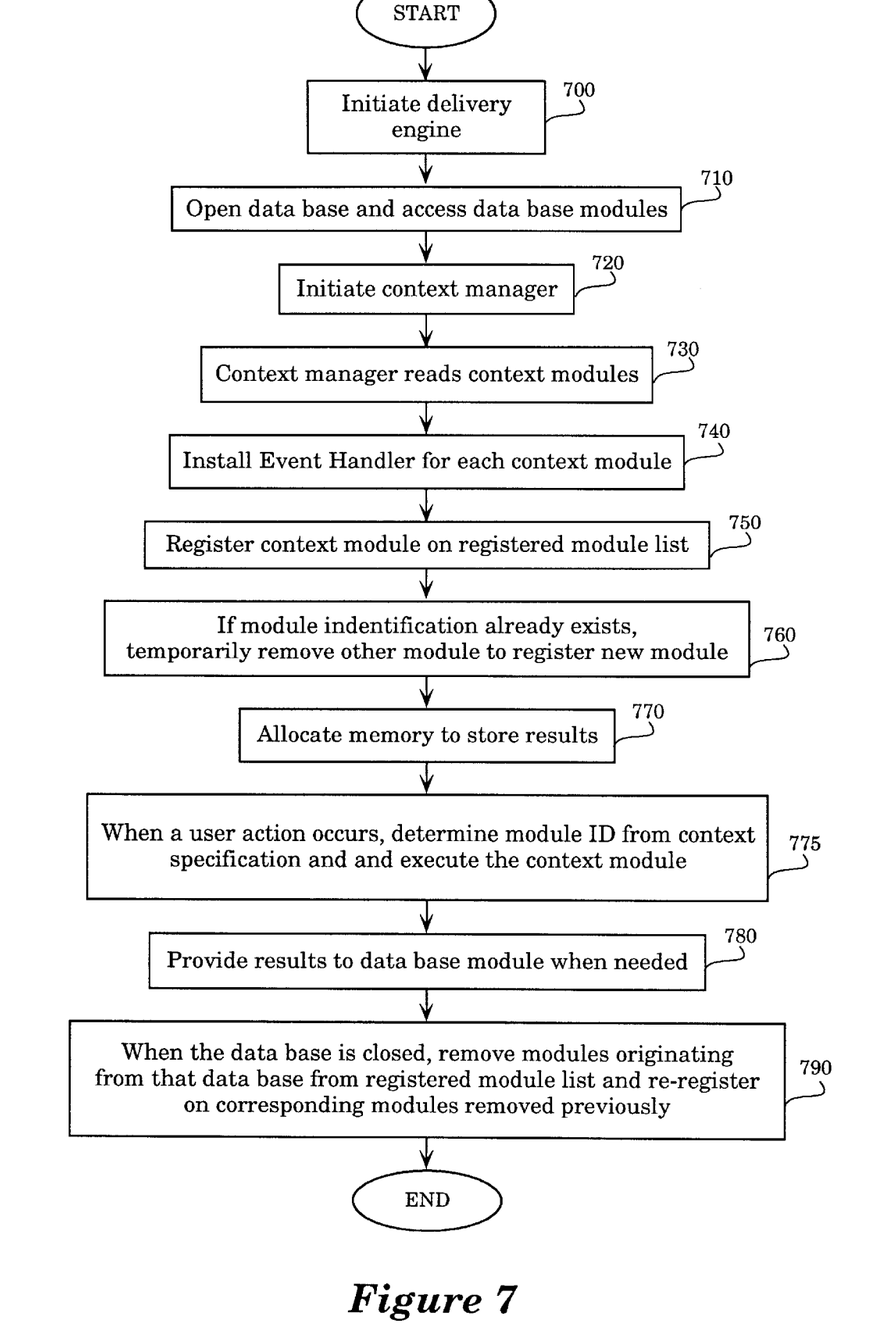
FIG. 7 is a flow diagram illustrating an alternate embodiment of the process of the present invention.

An exemplary flow diagram for this embodiment is shown in FIG. 7. At step 700, the delivery engine is initiated. At step 710, the data base is opened and the data base modules are accessed. The context manager is then initiated, step 720. At step 730, the context manager reads each context module and at step 740, an event handler is installed for each context module. Each context module is also registered on the registered module list. Memory is allocated at step 760 to store context check results. However, at step 770, prior to registering a module, the list is checked for an identically named module previously registered. The present module, by default, has priority over the prior registered module, therefore, the prior module is removed from the list the event handler is de-installed, and the present nodule is updated to identify the override of the prior module so that the present module can be installed. At step 770, memory is allocated to store the results of the context checks.

When a user action occurs, step 757, the module ID of the module to perform a context check is determined from the module specification and an event is generated to cause a context check to be performed. The results are stored in memory and, at step 780, are provided to an application or process when requested. When a data base is subsequently closed, step 790, the context modules identified to be part of the data base are removed from the registered module list and the corresponding handlers are de-installed, those modules removed previously from the registered module list, due to the duplicate named modules, are re-registered on the list and the corresponding handlers are re-installed for subsequent execution.

Alternately, when a user action occurs, the module to perform a context check is determined from the module specification, and using the module ID, the registered module list is reviewed to determine the location of the context module to that is executed to perform a context check. The context manager then calls the module to be executed. Thus, the context manager causes execution of the context module currently registered in the registered module list.

Figure 8:
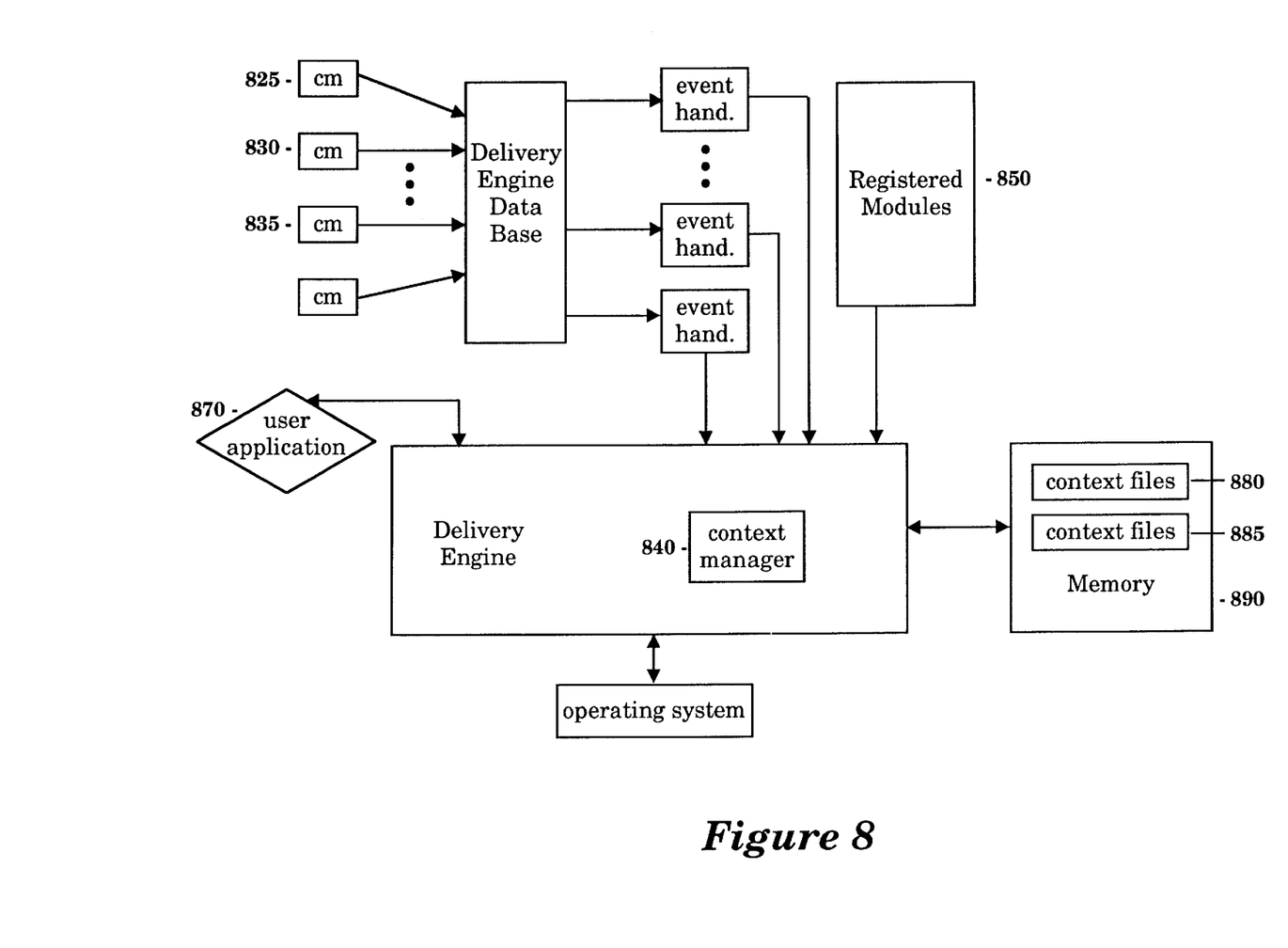
FIG. 8 is a block diagram illustrating the components in another embodiment of the present invention.

An alternate embodiment is shown in FIG. 8. In this embodiment, the registered module list 850 identifies not only the external context modules from the database that have been installed 825, 830, 835, 837, but also additional elements which perform context checks, in particular, user application 870 and context files 880, 885. These elements, 870, 880,885 are registered with the context manager by identification in the register module list 850 and are accessed by the context manager 840 as needed to perform context checks.

The context files 880, 885 are stored in memory 890 and are loaded into the context manager 840 for execution when appropriate. Preferably the context files 880, 885 are loaded into local memory and registered with the context manager when the delivery engine is initiated. The context files may be directly accessed by the context manager or accessed via a handler installed for a file. Therefore, in a multiple database environment, these modules are always present regardless of the database opened.

However, the loading of a particular context module may require the override of a context file provided at initiation of the delivery engine. The context manager can override context files or modules such that when context modules are loaded from the data base, and a context file having the same identification exists already in the registered module list, the registered file list will be updated to point to the context module from the data base. Thus, subsequently, when the particular database is closed, the context file module is restored and is once again identified on the registered module list.

Similarly, an application program can provide context information to the context manager. When an application program is initiated and is sophisticated enough to provide context information to the context manager, the application will send a message to the context manager indicating the context information it can provide. The information is then registered in the register module and called for when appropriate by the context manager. Upon receiving a request for context information, for example, via an Apple event, the application executes code to perform a context check and replies back to the context manager. Thus, the context information can come from a plurality of resources which are loaded at different times for different purposes, providing significant flexibility in implementation.

In addition, it may be found that certain context check functions are so common that the designer of the system may wish to make the context check function part of the context manager. For example, the gestault function which determines certain information regarding the system environment, such as the type of processor executing, may be installed with the context manager and therefore initiated when the context manager is initiated. In the present embodiment, this function, part of the operation of the context manager, is not included in the registered module list.

In one embodiment, a flag, referred to herein as the update flag, is preferably included to indicate that a certain data base module requires the state of a certain condition at a certain point in time. Thus, a certain context is performed once in store to acquire a "snapshot" of the context. Subsequently, when the condition requires the context information, the snapshot is supplied. This flag may be turned on and off at needed in accordance with the application. If the flag is turned off, a context check is performed each time a request for context information is made.

Figure 9:
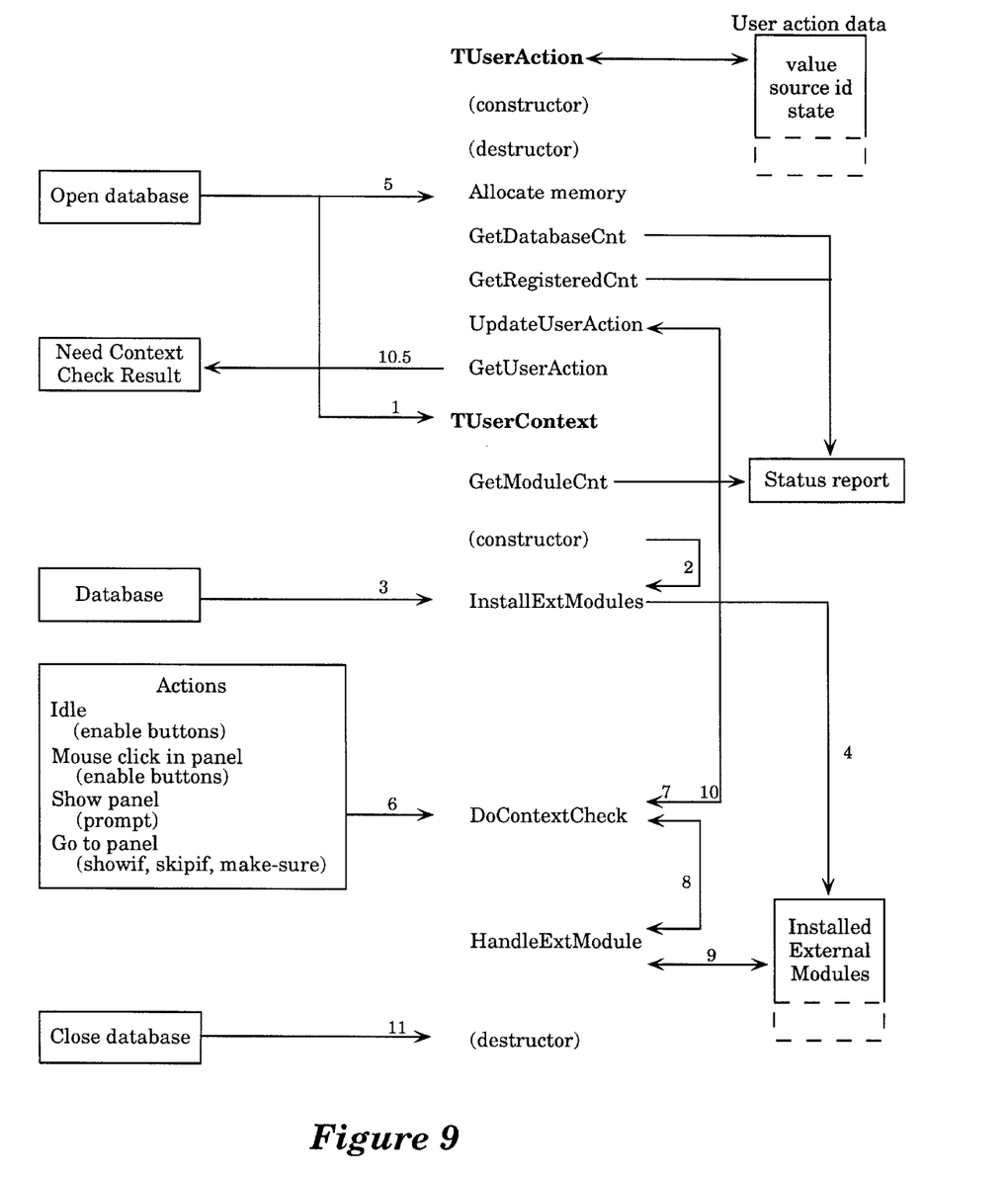
FIG. 9 is a diagram illustrating the modules and process flows employed in a preferred embodiment of the system and method of the present invention.

FIG. 9 is illustrate of the process flow and system elements employed in one preferred embodiment of the present invention. Exemplary code is provided in Appendix A. Referring to FIG. 9, TUserAction and TUserContext are two C++ modules which, when initiated, perform the functions of the context manager described herein. The components defined in each module identify steps performed to acquire information regarding the user context, the arrows and numbers associated with each arrow identifying the sequence of execution. Although FIG. 9 illustrates one preferred way for implementing the system and method of the present invention, it is readily apparent that the present invention is not limited as such and system and method can be implemented a variety of ways employing different software and hardware configurations.

The present invention has been described in conjunction with the preferred embodiment. It is evident that numerous, alternatives, modifications, variations and uses will be apparent to those skilled in the art in light of the foregoing description.

What is claimed is:

1. In a computer system comprising a processing unit executing at least one process, said computer system operating in a context, a context checking mechanism for evaluating context comprising:

a database comprising a plurality of database modules;

a delivery engine which retrieves database modules and executes instructions in accordance with database modules when said database is opened;

at least one context module stored in the database, said context module, when executed, performing a context check and providing, a result, a memory for storage of the result;

a registered module list, each element in the list comprising an identification of each context module ("module ID") and a pointer to the location of the context module; and a context manager which manages the checking of context, said context manager retrieving said context module when said database is opened, said context manager causing the execution of the said context module upon occurrence of a specified event and providing the result of the context check when requested by a process, wherein if a first element in the list identifies a first context module having a first module ID and a second context module to be loaded has the first module ID, said context manager causing the first element to be removed from the list and a second element to be added to the list thereby overriding the first context module, said second element further comprising an identification of the location of the overridden first context module.

2. The context checking mechanism as set forth in claim 1, wherein when the second context module is unloaded and the second element of the registered module list is to be removed, said context manager re-loading the first context module, the location of which is identified in the second element of the registered module list.

3. In a computer system comprising a processing unit executing at least one process, said computer system operating in a context, a context checking mechanism for evaluating context comprising:

a database comprising a plurality of database modules;

a delivery engine which retrieves database modules and executes instructions in accordance with database modules when said database is opened, wherein the deliver engine executing a database module requests a result of a context check;

at least one context module stored in the database, said context module, when executed, performing the context check and providing the result;

a memory for storage of the result;

a context manager which manages the checking of context, said context manager retrieving said context module when said database is opened, said context manager causing the execution of the said context module upon occurrence of a specified event and providing the result of the context when requested by a process.

4. The context checking mechanism as set forth in claim 3, wherein the database module identifies a next database module the delivery engine is to retrieve and execute based upon the result of the context.

5. In a computer system comprising a processing unit executing at least one process, said computer system operating in a context, a context checking mechanism for evaluating context comprising:

a database comprising a plurality of database modules;

a delivery engine which retrieves database modules and executes instructions in accordance with database modules when said database is opened;

at least one context module stored in the database, said context module, when executed, performing a context check and providing a result;

a memory for storage of the result;

a context manager which manages the checking of contest, said context manager retrieving said context module when said database is opened, said context manager causing the execution of the said context module upon occurrence of a specified event and providing the result of the context when requested by a process, wherein said context manager retrieves and loads a copy of the context module when the database is opened, said context manager further unloading the context module when the database is closed, wherein the context modules are executed when the database is opened.

* * * * *